3,730,808
PRODUCTION OF COMPOSITE FIBER REINFORCED RESIN ARTICLES

Frank Fekete, Monroeville, and Leonard J. Pulman, Pittsburgh, Pa., assignors to Koppers Company, Inc.
Filed Sept. 24, 1970, Ser. No. 74,972
Int. Cl. C09j 5/02
U.S. Cl. 156—332                                3 Claims

ABSTRACT OF THE DISCLOSURE

Composite fiber reinforced polyester resin articles comprising a multi-layered structure the interior of which is formed of polyester resin material having fiber reinforcement incorporating relatively coarse or heavy fibers in a relatively thick and/or dense fiber reinforcement mat, and a surface layer which is formed of polyester resin material which may also have a fiber reinforcement but formed of relatively fine or light fibers in a relatively thin and/or sparse fiber reinforcement mat. The formation of the composite structure contemplates the use of prethickened uncured polyester resin material for both the interior portions or layers of the article and also for the surface layer, and polyester resin formulations having different characteristics are contemplated for use in the interior and surface layers, respectively, the several layers being preassembled and then consolidated and cured under heat and pressure.

GENERAL STATEMENT AND BACKGROUND OF THE INVENTION

This invention relates to the production of composite fiber reinforced polyester resin articles or structures and the invention is concerned both with the provision of articles of improved characteristics and with improved techniques or methods for producing such composite articles.

Fiber reinforced polyester resin articles have been formed by a variety of techniques most of which have heretofore utilized the resin material in liquid form at the time the article is being built up or fabricated, for instance by drawing fiber reinforcement webs through a bath of liquid resin material, or by hand lay-up of fibrous mats on a form or in a mold, after which the liquid resin material is applied so as to saturate the reinforcements. With both of these prior techniques, after the reinforcements saturated with the liquid resin are positioned in the desired shape or form, heat is applied in order to cure the resin and thus convert the resin from the liquid condition to the solid state and thereby produce the article.

Various of the foregoing prior art techniques have provided for the fabrication of composite articles, i.e., articles having multiple layers of fibrous reinforcements and/or layers of different types of resin materials. For instance, in the technique of drawing fibrous reinforcement layers or webs through a liquid resin bath and then applying heat to cure the resin, it is known to use layers of different types of reinforcement in different positions in the article. Moreover, in the hand lay-up technique where fibrous mats are placed upon a form or in a mold and then saturated with liquid resin, it is known to initially apply a layer of resin material, sometimes referred to as a gel coat, to a surface of the form or mold on which the article is to be built up, so that the surface layer may have different characteristics than the interior of the article.

OBJECTS

The present invention is concerned with a new technique for producing composite articles or structures and provides a method having striking advantages as compared with prior art methods, the new technique also resulting in production of articles of improved characteristics.

Briefly, in accordance with the present invention, instead of making or forming the product directly from liquid resin materials, the invention contemplates utilizing prethickened but uncured polyester resin formulations. More specifically, the invention provides for the use of multiple layers of prethickened and uncured resin formulations, a layer at a surface of the article being different from a layer in the interior of the article, either with respect to the composition of the thickened resin material, or with respect to the presence or absence of fiber reinforcements therein, or with respect to the character of the reinforcements used in different layers of the product. As will further appear, this technique of employing layers of prethickened and uncured resin formulations differing from each other in various respects such as those mentioned above has many advantages as compared with prior art techniques for producing composite fiber reinforced resin articles. One of the important advantages flows from the facility with which the prethickened layers may be handled, assembled and cured, as compared with employment of resin material in liquid form in at least certain layers of the composite article being made. Multilayered composite articles may thus be manufactured much more efficiently and accurately than was possible when the resin was used in liquid form.

In a typical preferred embodiment according to the invention, a composite article is made up of a plurality of layers, one layer or mat disposed at the surface of the article containing a fibrous reinforcement in the form of a "veil" of fibers, i.e., a thin network of fibers preferably of relatively small diameter and with the fibers lying predominantly in the plane of the veil and of the mat. In this typical example, such as surface mat is advantageously applied to other layers or mats making up the interior structure of the article, the interior mats having fibrous reinforcement in the form of a relatively thick and dense mass of fibers in which the fibers are preferably of relatively large diameter and in which various of the fibers not only extend within the plane of the mat but also in which at least portions of various fibers extend at different angles to the plane of the mat.

In a typical case, in addition to the employment of the fine fibers in a veil type of fiber reinforcement in the surface mat and of the coarse fibers in a dense and thick type of reinforcement in the interior mat or mats, the invention also contemplates the utilization in the surface and interior mats of polyester resin formulations which are different and which are adapted respectively to contribute various desired physical, chemical, electrical or weathering characteristics to the surface layer and to the interior, respectively, of the article being made.

By the practice of the preferred technique of the invention in which both the character of the fibrous reinforcement and also the character of the resin formulation is different at the surface of the article as compared with the interior, it is possible, for example, to provide a structural member, for instance a panel of which the interior has high strength and of which the surface layer substantially completely conceals the fibers of the reinforcement present in the article. The surface layer may also provide increased light or weathering resistance, or some other chemical or physical properties not possessed to the same degree by the resin materials of the interior layers.

Although the fine fibers or the veil type of fibrous reinforcement preferably used in the surface layer is not characterized by great strength, it is nevertheless well adapted to resist check cracking and, in addition, is well adapted to provide a smooth surface and to conceal the underlying fibers of the denser or coarser reinforcement which is preferably employed in the interior layers in order to contribute a high degree of strength to the product.

TYPICAL OPERATION

In a typical operation according to the present technique, the prethickened but uncured mats of polyester resin material containing the fibrous reinforcements referred to are pre-essembled and are thereafter subjected to heat and pressure in order to consolidate the article and to cure and inter-bond the resin materials of the several layers. For example, in the making of a panel (see FIGS. 3 and 4), a surface layer or mat, such as shown at 5, formed of prethickened but uncured polyester resin material containing a veil of reinforcement fibers may be placed upon a support. Several layers or mats 6 of prethickened but uncured polyester resin material each containing a dense reinforcement of coarse fibers are then placed upon the surface layer. Finally, a second surface layer or mat 7 like the first is placed upon the core layers. The assembly is then placed in a press and the press plates brought together under pressure and heated so as to cure and consolidate the article.

Figure 1:
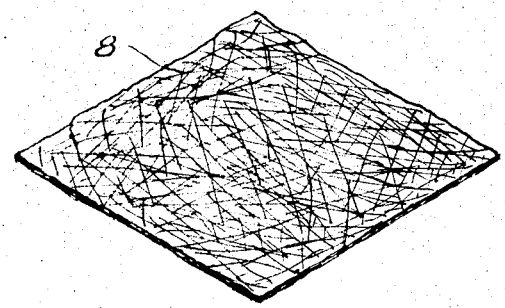
FIG. 1 somewhat representatively illustrates a fine fiber veil type of reinforcement web suitable for use in the prethickened polyester resin mats to be positioned at the surface of an article to be made.

In such a typical operation, the veil of fibers comprises glass fibers of about 0.00060 inch in diameter and the overall thickness of the veil is about 0.02 inch, the fibers of the veil being randomly oriented in the mean plane of the veil as indicated at 8 in FIG. 1. Such a veil, which weighs about 0.2 oz./sq. ft., is available on the market as made by Owens-Corning Fiberglas Corporation under the identification Bonded Mat and is referred to generally as a surfacing mat.

The uncured or polymerizable polyester resin formulation that is used to impregnate the mats used to form the surface layers can be prepared as follows.

An unsaturated polyester condensate (made by reacting about 14.3 mole percent of tetrahydrophthalic anhydride, about 35.7 mole percent of maleic anhydride, about 23.8 mole percent of neopentyl glycol, and about 26.2 mole percent of ethylene glycol and having an acid number of about 10-20) is mixed with 32 percent of styrene cross-linking agent. To this polymerizable composition is added also the following: 36.6% of clay, 0.73% of zinc stearate, 0.36% of tertbutyl perbenzoate catalyst, 0.36 percent of CaO and 0.36% of Ca(OH)$_2$. The veil of glass fibers is impregnated with this liquid formulation. The viscosity of the formulation when it is applied to the veil is about 8,000–10,000 cps. (If the formulation has been allowed to stand for about 24 hours it would have reached a viscosity of about 5 million cps.) Within about 15 hours, the formulation has thickened to the extent that the resulting prethickened uncured polyester resin mat is readily handleable and substantially tack free. The cured product of this formulation has relatively good high temperature and electrical properties.

Calcium oxide and calcium hydroxide are the ingredients providing for thickening of the resin formulation and the quantities of these ingredients present are sufficient to increase the viscosity of the resin formulation to about 5,000,000 cps. However, the increase in viscosity does not occur immediately but only after an interval of time as indicated above, so that the veil reinforcement may be impregnated with the liquid material before it thickens. After the impregnation and after the thickening has occurred, for example, to the viscosity referred to above, the mat is shape retaining and it may readily be handled during the assembly of the various layers of which the article is formed. With the formulation indicated, the thickened resin material is also substantially tack-free, which is further of advantage from the standpoint of handling the material.

Figure 2:
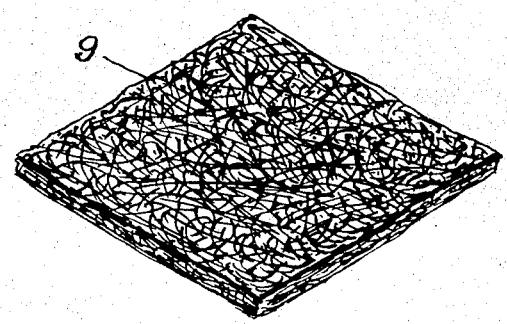
FIG. 2 is a view similar to FIG. 1 but illustrating a coarse fiber dense reinforcement web suitable for use in the prethickened polyester resin mats to be positioned in the interior of an article to be made.

In the typical assembly described above and illustrated in the drawing, the mats 6 of which the interior or core is made up may be prepared by using a glass fiber reinforcing mat formed of chopped glass strands. The glass fibers are about 0.000375 inch in diameter. The overall thickness of the mat is about 0.056 inch and it weighs about 2 oz./sq. ft. The relatively coarse and dense fiber reinforcement of the mats 6 is indicated at 9 in FIG. 2. Such a mat is available on the market as made by Owens-Corning Fiberglas Corporation under the identification chopped strand mat.

The uncured polymerizable polyester resin formulation than can be used to make up the mat employed for the interior or core of the article can be prepared as follows.

An unsaturated polyester condensate (made by reacting about 25 mole percent of phthalic anhydride, about 25 mole percent of maleic anhydride and about 50 mole percent of polyethylene glycol and having an acid number of about 10-20) is mixed with about 30% of styrene. To this polymerizable composition there is added also the following: 36.6% of CaCO$_3$, 0.73% of zinc stearate, 0.36% of tertbutyl perbenzoate catalyst, 0.36% of CaO and 0.36% of Ca(OH)$_2$. The glass fiber reinforcing mat described above is impregnated with this liquid formulation. The viscosity of the formulation when it is applied to the mat is about 8,000–10,000 cps. (If the resin has been allowed to stand for about 24 hours it would have reached a viscosity of about 5 million cps.) Within about 15 hours, the formulation has thickened to the extent that the resulting prethickened uncured polyester resin mat is readily handleable and substantially tack free. The cured product of this formulation has relatively good strength for its cost.

As with the formulation for the surface mats, calcium oxide and calcium hydroxide are the ingredients providing for thickening of the formulation, and here again the delayed action of the thickening agents enables the impregnation of the fiber reinforcement before the thickening occurs. As with the surface mats, the viscosity of the thickened resin materials is of the order of 5,000,000 cps. and provides a substantially tack-free surface.

In a typical operation for producing a panel of about ⅛ inch thickness, the article would be made up of two or three layers of core mat and one layer of surface mat at each face of the panel. The assembly or sandwich of layers is then placed between heated press plates and a pressure of about 1000 p.s.i. applied, the press plates being heated to about 260° F. This pressure and heat is maintained for a period of about 2 minutes, and the panel is then cured and consolidated.

Figure 3:
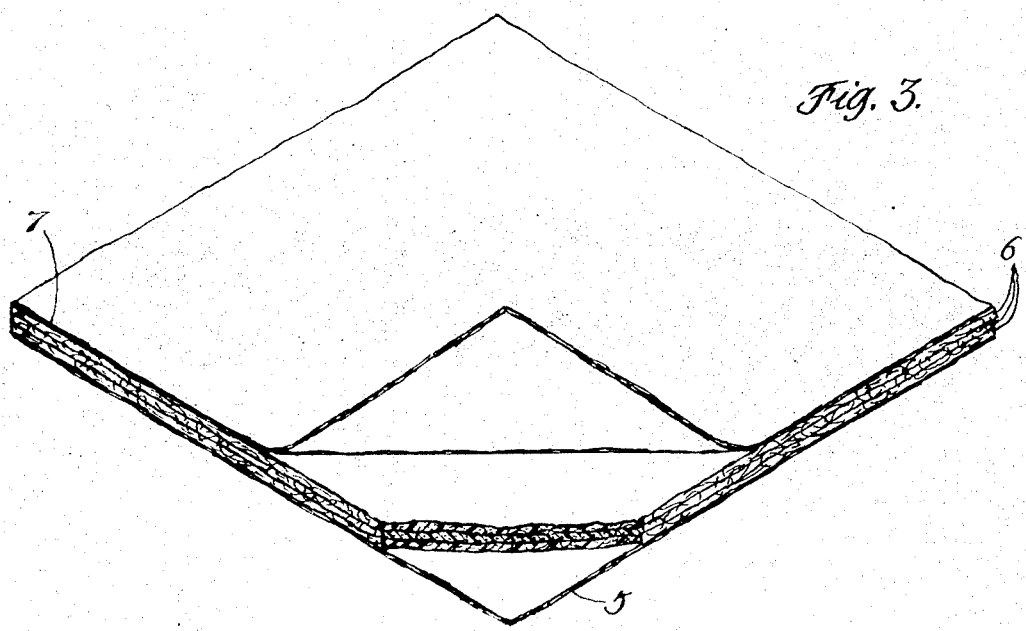
FIG. 3 is a fragmentary perspective view of an assembly of prethickened resin mats containing reinforcement webs of the kinds shown in FIGS. 1 and 2, portions of the assembly being broken away and shown in section.
Figure 4:
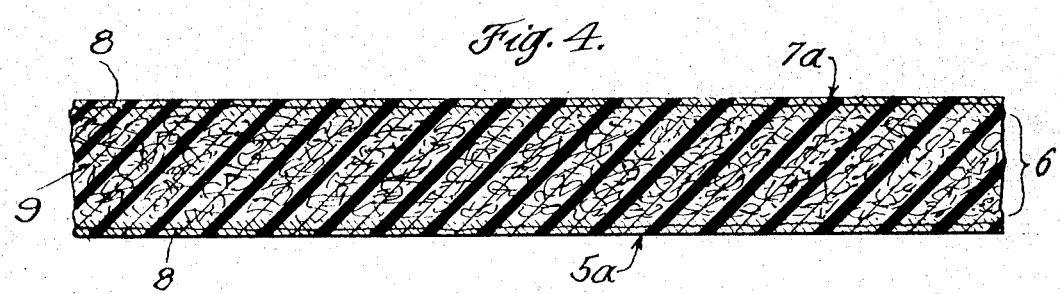
FIG. 4 is a fragmentary sectional view of a cured article, this view being on an enlarged scale as compared with FIG. 3.

The condition or structure of the panel is indicated in section in FIG. 4, this view being on an enlarged scale as compared with FIG. 3. Here it will be noted that the resin materials of all of the layers are inter-bonded and in effect become a homogeneous structure, as is indicated by the section lining extended from one surface of the article to the other. Surface layer portions 5a and 7a, although inter-bonded with the resin of the interior layers, nevertheless retain some of their individual characteristics, as is indicated by the fine section lining in the surface layer portion at each side of the product in FIG. 4.

FIG. 4 also diagrammatically indicates the fine or veil type reinforcements 8 which are still present in the surface layers at opposite sides of the central mass of coarser fibers indicated by the reference numeral 9. The presence of the veil type of reinforcements 8 in the surface layers aids in providing a smooth surface to the product, and in obliterating or concealing surface markings which might otherwise result from coarser fibers and denser reinforcements of the interior portion of the product.

ALTERNATIVE PROCEDURES

In the typical operation described above the preassembled mats made up of fibers and uncured and prethickened resin material are placed between the plates of a press, the assembly or sandwich comprising a multiple layer core and a surface mat at each face. It will be understood that a different number of layers, even one layer, may be incorporated in the core and also that if desired more than one layer of the surfacing mats containing the veil reinforcement may be applied at any desired surface of an article being made.

The invention is also applicable to the making of a wide variety of articles or structures, such as panels, containers, enclosures, electrical components, bathroom fixtures, structural shapes or other specialized shapes for specific uses. Moreover, the surfacing layer need not always be provided at all exposed surfaces of the article but may be used only at selected surfaces or at a single surface. For instance in the case of a panel, the composite article may comprise one or more layers making up a substrate incorporating dense reinforcements, and a surfacing layer may be applied at only one side of the panel, for instance a side which is exposed either for purposes of decoration, or weatherproofing, or for some other specific purpose.

The pressure applied during the curing need not necessarily be applied merely between the flat plates of a press, but in any appropriate matched metal molds. For example, a panel may be formed and may be completely encapsulated within a surfacing layer, for instance by applying the surface layer not only to the faces of the core but also to the edges of the core, and the article may then be consolidated and cured in a mold having surfaces engaging the edges as well as the side faces of the panel.

The conditions under which the curing and molding of the mats is effected will vary depending on a number of variables, including particularly the specific resin formulation being used; they can be selected best on the basis of experience. In general, polymerizable polyester resin formulations of the type which can be used in this invention can be cured and molded conveniently under pressures of about 100 to about 3,000 p.s.i. at temperatures within the range of about 180° F. to about 325° F. and for a period of time of about 1 to 5 minutes. Exemplary of preferred curing and molding conditions that can be used are pressures of about 500 to about 1,000 p.s.i. temperatures within the range of about 240° F. to about 280° F. and for a period of time of about 2 to 3 minutes.

Still other molding techniques may be employed, for instance the surfacing layer containing a fibrous veil may be applied to the face of a form or mold part, after which one or more layers or mats containing dense reinforcements may be applied. The assembly of the form and the layers of mats may then be placed within a bag of the kind employed in bag molding, the bag with its contents being placed in an autoclave for curing under heat and pressure therein.

For certain purposes the surface and interior layers may be formed of prethickened resin material of the same composition or formulation, the layers, however, differing from each other in certain other respects, for instance with respect to the character and/or quantity of reinforcement fibers incorporated.

Moreover, multi-layered composite articles may be formed in which the surface and interior layers differ from each other in that one layer, for instance the surface layer, may contain no reinforcement fibers, and this variant may be resorted to whether or not the prethickened resin material utilized in the several layers is of the same or different formulation.

In some cases advantages may even be attained in the practice of the invention by making up a composite product or article in which the same reinforcement fibers are utilized in all layers but in which the several layers differ from each other in consequence of employment of prethickened resin material of different composition in the respective layers.

In all cases, the fabrication or production of such multi-layered composite articles is greatly simplified, as compared with any of the prior techniques employing liquid resin material in one or more of the layers.

FIBROUS REINFORCEMENT

Although reference is made above to the use of glass fiber reinforcements, it is to be understood that various other natural or synthetic fibrous reinforcements may be used also, for example asbestos or synthetic fibers such as acrylonitrile fibers, polyester fibers and polyvinyl alcohol fibers. However, glass fibers are preferred for most purposes.

It is preferred that where a fibrous reinforcement is used in the surfacing layer or mat, it be of the type that will produce a smooth surface. In general such a mat will be composed of relatively small diameter filaments, for example about 0.0002 to about 0.0007 inch and the mat will be relatively thin, for example about 0.01 to about 0.03 inch. Mats of this type will generally weigh from about ⅛ to about ¼ oz./sq. ft.; however they can be heavier for example up to about 2 oz./sq. ft. It is preferred that the fibers incorporated in the veil employed in a surfacing mat be extended at least primarily within the mean plane of the veil or mat, although advantageously they should extend in more than one direction in said plane. The small diameter and arrangement of the fibers and the relatively small thickness of the surfacing mat is important in order to provide for production of a smooth surface which will not display fiber outlines. The presence of the fine veil fibrous reinforcement in a surface layer aids in concealing the underlying relatively coarser reinforcement comprising the interior layers.

One example of a commercially available fiborus veil has been mentioned above and in addition others are made by Modiglass Division of Reichold Chemicals and identified as CFRM mat.

The surfacing layer can be prepared also by metering chopped glass fibers (for example, about 0.5 to about 2.0 inches in length) onto a layer of the liquid resin formulation. A suitable mat can be obtained when the formulation thickens.

The fibrous reinforcement selected for the interior of the article will be generally the type that will provide relatively high strength to the article. Examples of glass reinforcements that will accomplish this are mats referred to as chopped strand mats and continuous strand mats. Exemplary thicknesses of such mats are about 0.01 to about 0.25 inch; they can vary in weight from about ¾ oz./sq. ft. to about 3 oz./sq. ft. Exemplary diameters of the filaments comprising the mats are 0.0002 to about 0.0007 inch.

The fibers of these dense mats also advantageously include fibers extending not only in the mean plane of the mat but also at angles to the mean plane, to thereby further enhance the reinforcing effect of the reinforcement and thus increase the strength of the article being made.

In the case of glass fiber reinforcements, which are preferred, the character of the reinforcement mat itself may vary, one form of reinforcement comprising a mat of randomly distributed fibers densely matted together. Reinforcements of this type in the form of strips or sheets are available on the market, for instance reinforcements made by Owens-Corning Fiberglas Corporation, PPG Industries, Inc., Johns-Manville Corp. and Ferro Corporation.

Another form of reinforcement suitable for use in the layers to be incorporated in the interior of an article is woven fabric, including especially glass fiber woven fabrics. Fabrics of this kind are available in which the woven threads in effect comprise rovings or bundles of filaments. This type of reinforcement is characterized by very high strength and, in common with some of the dense mats referred to above also includes portions of the filaments which extend at angles to the mean plane of the mat, as a result of the weave of the fabric, in consequence of which the threads or rovings alternately extend in directions at an angle to the mean plane of the mat because of being woven over and under each other. Woven fabrics of this type are made by Hess Goldsmith, Inc., J. P. Stevens, Inc. and Owens-Corning Fiberglas Corporation.

Still further, reinforcements may be used in the interior layers of an article in which the reinforcements include a composite structure of rovings extended in at least one direction, together with randomly oriented fibers distributed between and around the rovings. An example of this type of mat is Rovmat made by Fiberglass Industries, Inc., As a still further alternative, the dense or coarse type of reinforcement may be provided by chopping the fibrous reinforcements and spreading the chopped pieces on a layer of the resin formulation while it is still liquid so that when the resin thickens it will incorporate randomly distributed and oriented fibers.

RESIN FORMULATIONS

Although for certain purposes the formulation of the polyester resin material employed for the several different types of mats embodied in certain composite articles may be the same, the invention is especially useful where it is desired that the resin formulations at the surface of an article be different from the resin formulation in the interior or core of an article.

In general, resin formulations appropriate for the core of an article are those particularly characterized by high strength. Although the resins used in the surfacing layers may also advantageously have good strength, nevertheless for surfacing purposes certain other characteristics are frequently of greater importance, especially where the surfacing layer is applied to a core of adequate thickness to contribute the strength desired in the article.

Thus, the surfacing formulation is frequently prepared so as to contribute chemical resistance or good weathering properties. In some cases the surfacing layer is relied upon for color, in which event appropriate coloring materials, such as pigments are included.

Still other specific chemical or physical properties may be contributed by special formulation of the resin of the surfacing layer. In general, however, it is of importance in connection with the formulation of the resin used in the surfacing layer that it be such as to aid in providing a smooth surface and also such as to aid in completely covering or concealing the underlying relatively coarse and dense character of the fibrous reinforcements in the core or substrate.

By employing prethickened uncured resin as a surfacing layer, either with or without fiber reinforcements, it is possible to achieve an improved surface and surface appearance by a very simple technique, which is not subject to the disadvantages and complication of certain prior art techniques in which a gel coat was applied to a mold or form in liquid condition prior to the lay-up of the reinforcements to be incorporated in the article. Any liquid application, especially to a form or mold of irregular shape, or even to an article of irregular shape, is subject to the disadvantages of gravity flow prior to gelling of the coating, with resultant irregularity in thickness of the gel coat. The prior art resort to adding thixotropic agents to the liquid resin materials to be applied is at best a makeshift; and this difficulty is completely overcome by the technique of the present invention because not only the layers of the core or substrate of the article are prethickened and thus form stable, but the same is also true of the surfacing layer. In consequence, surfacing layers of uniform thickness are readily obtained even where the surface is irregular and subject to differential effect of gravity in different areas.

The polyester of the prethickened uncured resin mat is an unsaturated polyester resin condensate that is formed by reacting an ethylenically unsaturated dicarboxylic acid or anhydride thereof with a dihydric alcohol. In addition, a saturated dicarboxylic acid or anhydride thereof may be included in the reaction mixture. The unsaturated polyesters produced by such reactions are combined with a vinyl monomer which is usually a solvent for the resin and which is capable of crosslinking with the unsaturated polyester to form a thermoset polymer. This class of polymers is well known.

Any of the available chemical thickening agents which are effective in thickening solutions or mixtures comprising an unsaturated polyester and a vinyl monomeric crosslinking agent can be utilized to prepare the prethickened and uncured resin mat. Examples of thickening agents that can be used are magnesium oxide, calcium hydroxide and a mixture of magnesium oxide and an aliphatic monocarboxylic acid or anhydride thereof. The following United States patents disclose such thickening agents: Nos. 2,628,209 and 3,390,205. A mixture of calcium oxide and magnesium oxide or calcium hydroxide is a preferred thickening agent (see U.S. Pat. No. 3,431,-320). It should be understood that the above mentioned thickening agents are but a few examples of thickening agents that can be used and that other available thickening agents can be added to the resin formulation to effect thickening thereof. It is noted also that the thickening of the polyester resin formulation is not effected by vinyl copolymerization between the unsaturated polyester resin and the crosslinking agent. Furthermore, it should be understood that thickening agents, as described above, are distinguishable from fillers and thixotropic agents which are often used in unsaturated polyester resin formulations and which have a tendency to increase the viscosity theerof.

The viscosity of the thickened resin should preferably be at least 10–15 million cps., but they can also be advantageously in the range of from about 5,000,000 cps. to about 60,000,000 cps. Such viscosities provide thickened resin materials which are readily handleable and formable and which can be substantially tack-free. They also are substantially shape retaining, and these various characteristics are of importance in facilitating the production of the multi-layered composite article according to the technique of the present invention.

As is well known, polyester resin formulations from which prethickened mats are formed generally contain other materials such as, for example, low profile additives, fillers, initiators or catalysts, crosslinking and stabilizing inhibitors, accelerators or promoters, mold release additives, etc. Such materials may be used in the prethickened resin mats utilized in the process of this invention.

Additional examples of the core or substrate mats are set forth in Table I below.

TABLE I

| | Uncured polyester resin mat (ingredients in, percent by weight) | | | | | |
|---|---|---|---|---|---|---|
| Ingredients | Ex. A | Ex. B | Ex. C | Ex. D | Ex. E | Ex. F |
| Unsaturated polyester, the reaction product in mols of— | | | | | | |
| a. 1.0 maleic anhydride; 1.0 phthalic anhydride; 2.2 propylene glycol | 25.6 | | | | | |
| b. 1.0 isophthalic anhydride; 1.4 maleic anhydride; 0.84 dipropylene glycol; 1.73 propylene glycol | | | 22.2 | | | 22.2 |
| c. 1.0 tetrachlorophthalic anhydride; 1.2 maleic anhydride; 2.2 ethylene glycol | | 24.2 | | | | |
| d. 1.0 tetrahydrophthalic anhydride; 3.0 maleic anhydride; 2.0 neopentyl glycol; 2.0 1,4 cyclohexanedimethanol | | | | 30.3 | | |
| e. 1.2 tetrahydrophthalic anhydride; 2.8 maleic anhydride; 2.0 neopentyl glycol; 2.2 ethylene glycol | | | | | 25.6 | |
| Crosslinking agent: | | | | | | |
| a. Styrene | 11.0 | 12.4 | 9.2 | | | 9.2 |
| b. Vinyl toluene | | | | 11.0 | 14.0 | |
| Thickening agent: | | | | | | |
| a. CaO | 0.36 | 0.36 | 0.31 | 0.36 | 0.37 | 0.31 |
| b. Ca(OH)₂ | 0.36 | 0.36 | 0.31 | 0.36 | 0.37 | 0.31 |
| Miscellaneous: | | | | | | |
| a. CaCO₃ | 36.6 | | 31.4 | | | 31.4 |
| b. Clay | | 36.6 | | 36.6 | 29.5 | |
| c. Chopped glass [1] | 25.0 | 25.0 | 35.0 | 25.0 | 25.0 | |
| d. Mat [2] | | | | | | 35.0 |
| e. Zinc stearate | 0.73 | 0.73 | 0.62 | 0.73 | | 0.62 |
| f. Catalyst | 0.36 | 0.36 | 0.31 | 0.36 | 0.37 | 0.31 |

[1] Chopped glass fibers, 2″ in length and 0.00039″ in diameter.
[2] Chopped strand mat weighing about 2 oz. per sq. ft. and having a thickness of about 0.16 inch.

Each of the above exemplary mats can be cured and molded into a thermoset product which has the overall properties that are inherent in products made from polyester resins. In addition, the cured product will be characterized by having one or more particularly good properties or characteristics. Thus, the cured product of Example A will have a relatively good combination of properties at a relatively low cost. The cured product of Example B will have relatively good self-extinguishing properties. The cured product of Example C will have relatively high strength. Good electrical and track resistant properties will be present in the cured product of Example D. Example E can be cured into a thermoset product that has relatively good chemical resistance and high temperature properties. And the cured product of Example F will have relatively high strength and moderate chemical resistance.

Additional examples of surfacing layers or mats are set forth in Table II below.

Each of the above exemplary surface mats can be cured and molded with a substrate mat to provide an article, the surface of which has the characteristics of the particular surface mat used. Thus, an article made from the mat of Example A will have a surface with relatively good ultraviolet and weather resistant properties. The use of the surface mat of Example B will provide an article with a glossy surface that has relatively good abrasive resistance. An article made from the surface mat of Example C will have a surface with relatively good chemical resistance, whereas one made from the mat of Example D will have not only good chemical resistance, but also relatively good high temperature properties. Good electrical and track resistant properties will be present in the surface of an article made from the surface mat of Example E. The cured mat of Example F will provide an article with a surface that has relatively good chemical and fire resistant properties. The mat of Example G can be cured into a product which will have a surface characterized by relatively good chemical resistance and relatively high strength. And an article made from the mat of Example H will have a surface with relatively good ultraviolet and weather resistant properties.

TABLE II

| | Uncured polyester resin mat (ingredients in, percent by weight) | | | | | | | |
|---|---|---|---|---|---|---|---|---|
| Ingredients | Ex. A | Ex. B | Ex. C | Ex. D | Ex. E | Ex. F | Ex. G | Ex. H |
| Unsaturated polyester: | | | | | | | | |
| a. V30023 [1] | | 86.3 | | | | | | |
| b. Hetron 197 [2] | | | | | | 23.8 | | |
| c. Atlac 382 [3] | | | 18.3 | | | | | |
| d. Derakane-114 [4] | | | | | | | 23.8 | |
| e. Rxn. product in moles of 1 tetrahydrophthalic anhydride; 3 maleic anhydride; 2 neopentyl; glycol; 2 1,4-dyclohexanedimethanol | | | | 30.3 | | | | |
| f. Rxn. product in mols of 1.2 tetrahydrophthalic anhydride; 2.0 neopentyl glycol; 2.0 1,4-cyclohexanedimethanol; 3.0 maleic anhydride | 25.6 | | | | 25.6 | | | |
| g. NPG Gel Coat Resin GC-5-2N [5] | | | | | | | | 86.3 |
| Crosslinking agent: | | | | | | | | |
| a. Styrene | 5.5 | | 18.3 | | | 12.8 | 12.8 | |
| b. Vinyl toluene | | | | 14.0 | 11.0 | | | |
| c. Methylmethacrylate | 5.5 | | | | | | | |
| Thickening agent: | | | | | | | | |
| a. CaO | 0.36 | 1.7 | 0.36 | 0.37 | 0.36 | 0.36 | 0.36 | 1.7 |
| b. Ca(OH)₂ | 0.36 | 1.7 | 0.36 | 0.37 | 0.36 | 0.36 | 0.36 | 1.7 |
| Miscellaneous: | | | | | | | | |
| a. CaCO₃ | | | | | | | | |
| b. Clay | 36.6 | | 36.6 | 29.5 | 36.6 | 36.6 | 36.6 | |
| c. Chopped glass [6] | 25.0 | | 25.0 | 25.0 | 25.0 | 25.0 | 25.0 | |
| d. Veil [7] | | 10.0 | | | | | | 10.0 |
| e. Zinc stearate | 0.73 | | 0.73 | | 0.73 | 0.73 | 0.73 | |
| f. Catalyst | 0.36 | 0.30 | 0.36 | 0.37 | 0.36 | 0.36 | 0.36 | 0.3 |

[1] A gel coat formulation containing monomer, fillers, etc. sold by Ferro Corporation.
[2] A chemical and fire retardant resin based on chlorendic anhydride (90–95% fumarate) sold by Hooker Corporation.
[3] A high chemical resistance resin based on dipropoxylated bisphenol-A with almost 100% isomerization of maleic to fumarate sold by Atlas Chemical Industries, Inc.
[4] A Dow Chemical Co. resin which is a vinyl ester of a bisphenol diepoxide reacted with fumaric acid to a high fumarate value. The resin has high chemical resistance, good electrical properties and high reactivity.
[5] A pigmented gel coat resin formulation of Eastman Chemical Products, Inc. It is made from 12.6 moles of neopentyl glycol, 6.0 moles of isophthalic acid and 6.0 moles maleic anhydride. The resin is diluted 60% with styrene.
[6] Chopped glass fibers, 1″ in length and 0.00039″ in diameter.
[7] Surface mat having a thickness of 0.015″ and weighing about ⅛ oz./sq. ft.

In comparing the chopped glass component of the core mats of Table I with the surface mats of Table II, it is noted that the chopped glass used in each of these types of mats differs only in length. The use of the shorter glass fibers in the surface mat will tend to produce an article that has a surface which would be smoother than one made from the mat having the longer fibers. Thus, this is another example of how the surface mat and underlying mat can differ in their fiber content.

In summary, this invention provides a relatively simple way of producing a composite article, the surface of which can have properties different from the core of the article.

What is claimed is:

1. A method for making a multi-layer reinforced resin laminate comprising separately impregnating layers of fibrous reinforcement with liquid uncured polyester resin material in a formulation containing a chemical thickening agent, after the resin material of the impregnated reinforcement layers has thickened sufficiently to render the layers readily separately handleable, formable and substantially tack-free, assembling the uncured but tack-free layers to form the laminate, the fiber reinforcement of one of said layers disposed at the surface of the article comprising a veil of reinforcement fibers and the fiber reinforcement of an interior one of said layers comprising a mat of fibers, said mat having greater fiber density than said veil, and applying heat and pressure to the assembly to consolidate and to cure and inter-bond said uncured resin materials of said prepared layers.

2. A method for making a multi-layer reinforced resin laminate comprising separately impregnating layers of fibrous reinforcement with liquid uncured polyester resin material in a formulation containing a chemical thickening agent, after the resin material of the impregnated reinforcement layers has thickened sufficiently to render the layers readily separately handleable, formable and substantially tack-free, assembling the uncured but tack-free layers to form the laminate, the fiber reinforcement of one of said layers disposed at the surface of the article comprising a veil of reinforcement fibers and the fiber reinforcement of an interior one of said layers comprising a mat of fibers, said mat having greater fiber density than said veil, the fiber reinforcements of the assembly of layers constituting a minor portion of the weight of said assembly, and applying heat and pressure to the assembly to consolidated and to cure and interbond said uncured resin materials of said preprepared layers.

3. In the manufacture of multi-layer reinforced resin laminates formed of a plurality of layers of polyester resin material each having reinforcing fibers therein, the method comprising assembling a plurality of separate preprepared layers each formed of uncured polyester resin material and each containing a chemical thickening agent and being chemically thickened to a tack-free condition, the resin material of each said layers constituting the total of the resin material to be incorporated in that layer of the laminate and each of said preprepared layers of resin material further having a fiber reinforcement embedded therein, the fiber reinforcement of each layer comprising a minor portion of the total weight of that layer, the fiber reinforcement of one of said layers disposed at the surface of the article comprising a veil of reinforcement fibers and the fiber reinforcement of an interior one of said layers comprising a mat of fibers, said mat having greater fiber density than said veil, and applying heat and pressure to the assembly to consolidate and to cure and inter-bond said uncured resin materials of said preprepared layers.

References Cited

UNITED STATES PATENTS

| | | | |
|---|---|---|---|
| 3,002,869 | 10/1961 | Hough et al. | 161—233 |
| 3,431,320 | 3/1969 | Baum et al. | 260—40 R |
| 3,219,604 | 11/1965 | Fischer | 260—22 |
| 2,552,124 | 5/1951 | Tallman | 161—156 |
| 2,628,209 | 2/1953 | Fisk | 161—233 |
| 2,688,580 | 9/1954 | Fingerhut | 161—156 |
| 2,765,247 | 10/1956 | Graham | 161—152 |
| 3,081,207 | 3/1963 | Fox | 161—152 |
| 3,554,941 | 1/1971 | Varnell | 161—233 |

MORRIS SUSSMAN, Primary Examiner

U.S. Cl. X.R.

161—152, 156, 170, 195, 231